United States Patent
Ishikawa et al.

(10) Patent No.: US 11,317,555 B2
(45) Date of Patent: May 3, 2022

(54) WORK VEHICLE

(71) Applicant: KUBOTA CORPORATION, Osaka (JP)

(72) Inventors: Shinnosuke Ishikawa, Osaka (JP); Yoshitomo Fujimoto, Osaka (JP); Takashi Uchida, Osaka (JP); Koichiro Kan, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 148 days.

(21) Appl. No.: 16/618,611

(22) PCT Filed: Jun. 28, 2018

(86) PCT No.: PCT/JP2018/024547
§ 371 (c)(1),
(2) Date: Dec. 2, 2019

(87) PCT Pub. No.: WO2019/004344
PCT Pub. Date: Jan. 3, 2019

(65) Prior Publication Data
US 2020/0178455 A1   Jun. 11, 2020

(30) Foreign Application Priority Data
Jun. 28, 2017 (JP) .............................. JP2017-126559

(51) Int. Cl.
*A01B 63/00* (2006.01)
*A01B 69/00* (2006.01)
*A01B 63/02* (2006.01)

(52) U.S. Cl.
CPC ............ *A01B 63/008* (2013.01); *A01B 63/02* (2013.01); *A01B 69/00* (2013.01)

(58) Field of Classification Search
CPC ........ A01B 63/008; A01B 63/02; A01B 69/00
See application file for complete search history.

(56) References Cited

U.S. PATENT DOCUMENTS

2017/0231148 A1   8/2017   Miwa et al.

FOREIGN PATENT DOCUMENTS

| DE | 101 40 383 A1 | 3/2003 |
|---|---|---|
| JP | 61-37009 | 2/1986 |
| JP | 61 192368 A | 8/1986 |
| JP | 02-21959 A | 1/1990 |
| JP | 05 344811 A | 12/1993 |
| JP | 07 194204 A | 8/1995 |
| JP | H11-18517 A | 1/1999 |
| JP | 2001-218503 A | 8/2001 |
| JP | 2005 46099 A | 2/2005 |

(Continued)

OTHER PUBLICATIONS

Office Action dated Jul. 28, 2020 in Japanese Patent Application No. 2017-126559 and English language translation thereof.

(Continued)

*Primary Examiner* — Tara Mayo-Pinnock
(74) *Attorney, Agent, or Firm* — Greenblum & Bernstein, P.L.C.

(57) ABSTRACT

A machine body side control device is configured to control an actuator based on information on a posture change of a machine body obtained from a machine body side sensor and information on a position of an implement relative to the ground surface obtained from an implement side sensor via an implement side control device.

5 Claims, 5 Drawing Sheets (56) References Cited

FOREIGN PATENT DOCUMENTS

| | | |
|---|---|---|
| JP | 2012-80845 A | 4/2012 |
| JP | 2014 187954 A | 10/2014 |
| JP | 5912369 B2 | 4/2016 |
| JP | 2016 078830 A | 5/2016 |
| JP | 2016 154501 A | 9/2016 |
| JP | 2016-198004 A | 12/2016 |
| JP | 2018-0018 A | 1/2018 |
| WO | 2008/088916 A2 | 7/2008 |

OTHER PUBLICATIONS

Official Communication issued in International Bureau of WIPO Patent Application No. PCT/JP2018/024547, dated Aug. 14, 2018.
Extended European Search Report issued in European Patent Application No. 18823758.0 dated Feb. 17, 2021.

WORK VEHICLE

TECHNICAL FIELD

This invention relates to a work vehicle having an implement connected to a machine body and capable of carrying out a ground work.

BACKGROUND ART

An example of a work vehicle described above is disclosed in Patent Document 1 identified below. This work vehicle includes an actuator (a "lift cylinder" and a "lift rod" in the document) provided in a machine body and capable of changing a position of the implement relative to the machine body and a machine body side sensor capable of detecting a posture change of the machine body.

With this work vehicle, based on information on the posture change of the machine body detected by the machine body side sensor, the actuator is driven to change the position of the implement relative to the machine body. With this arrangement, irrespectively of a change in the posture of the machine body, the implement can be maintained under a horizontal state, for example.

PRIOR-ART DOCUMENT

Patent Document

Patent Document 1: Japanese Unexamined Patent Application No. 2012-80845 Publication Document

SUMMARY OF THE INVENTION

Problems to be Solved by Invention

Incidentally, in a field having unevenness on the ground surface, it may occur that a portion of the machine body may ride on a bump or fall into a sunken place. In such case, between the ground surface with which the machine body is placed in contact and the ground surface positioned immediately below the implement, there may occur a terrain difference such as a level difference, a slope difference, etc.

In the above-described conventional technique, the actuator is controlled by using only the information on the machine body side, without using information on the implement side.

For this reason, in the case of presence of a terrain difference between the ground surface with which the machine body is placed in contact and the ground surface positioned immediately below the implement described above, it was not possible to control the actuator for resolving influence from such terrain difference.

As a result, in case a work is to be carried out in a field having unevenness on the ground surface for instance, e.g. in the vicinity of the uneven place, the position of the implement may be displaced from the target position, so the finishing condition of the ground work by the implement in the field may not be as expected.

In view of the above-described state of the art, there is a need for a work vehicle capable of realizing an expected finish condition of a ground work by an implement in e.g. a field having unevenness on the ground surface.

Solution

A work vehicle according to the present invention comprises:

an implement connected to a machine body and capable of carrying out a ground work;

an actuator provided in the machine body and capable of changing a position of the implement relative to the machine body;

a machine body side sensor provided in the machine body and capable of detecting a posture change of the machine body;

an implement side sensor provided in the implement and capable of detecting a position of the implement relative to the ground surface;

an implement side control device provided in the implement and obtaining the position of the implement relative to the ground surface from the implement side sensor;

a machine body side control device provided in the machine body and controlling the actuator so that the position of the implement relative to the ground surface may agree to a target position; and the machine body side control device being configured to control the actuator based on information on the posture change of the machine body obtained from the machine body side sensor and information on the position of the implement relative to the ground surface obtained from the implement side sensor.

With the present invention described above, the implement is provided with an implement side control device that manages information relating to the implement and the information on the implement is transmitted from the implement side control device to the machine body side control device, to be utilized for controlling of the actuator by the machine body side control device.

Specifically, an arrangement will be made such that the position of the implement relative to the ground surface is calculated based on information relating to a size of a constituent component, a control amount of the actuator and a posture change of the machine body, on the assumption of traveling on a flat ground surface. In the case of traveling on a flat ground surface, the actuator will be controlled such that the position of the implement relative to the ground surface may agree with the target position of the implement. With this, the position of the implement relative to the ground surface detected by the implement side sensor may agree with the actual position of the implement relative to the ground surface. On the other hand, if a terrain difference occurs between the ground surface with which the machine body is placed in contact and the ground surface positioned immediately below the implement in the course of traveling on an uneven land, a difference will develop between the detected position of the implement relative to the detected ground surface and an expected position of the implement relative to the ground. In this case, the machine body side control device will adjust the position of the implement in accordance with such terrain difference by controlling the actuator in such a manner as to resolve such difference.

With the above-described arrangement, even in a field having much unevenness in the ground surface, it becomes possible to maintain the position of the implement relative to the ground surface at the target position, so that a ground work by the implement can be carried out as expected, irrespectively of the location of the field.

As described above, with the present invention, it is possible to realize an expected finish condition of a ground work by an implement in e.g. a field having unevenness on the ground surface.

In the present invention, preferably:

the implement is configured to carry out a ground work under a state of being spaced from the ground surface.

With the above-described arrangement, it is possible to keep a spacing from the ground surface (height from the ground surface) at a target height. Thus, it is possible to maintain e.g. a spraying amount of farming material by the implement at a constant amount, irrespectively of presence/absence of ground surface unevenness.

In the present invention, preferably:

as the implement side sensor, there is provided a distance sensor for detecting a height of the implement relative to the ground surface; and the machine body side control device is configured to effect controlling of the actuator, based on information relating to the height of the implement relative to the ground surface detected by the distance sensor.

With the above-described arrangement, the distance sensor detects a height of the implement from the ground surface. Then, with using this detected information of the height of the implement from the ground surface, the actuator may be controlled to keep the height of the implement from the ground surface at the target height.

In the present invention, preferably:

the actuator includes a lift cylinder capable of lifting up/down the implement relative to the machine body, a link cylinder capable of changing a length of a top link capable of changing a posture of the implement in a pitching direction relative to the machine body, and a rolling cylinder capable of changing a posture of the implement in a rolling direction relative to the machine body.

With the above-described arrangement, the height of the implement relative to the ground surface, the rolling posture of the implement relative to the ground surface and the pitching posture of the implement relative to the ground surface are adjustable. Thus, the posture of the implement can be maintained substantially parallel with the ground surface while maintaining its height at the target height.

In the present invention, preferably:

the implement side control device stores therein a work map in which respective target values for a ground work are set for respective unit sections; and the machine body side control device is configured to obtain a target value from the implement side control device and calculate the target position from the target value.

With the above-described arrangement, even when the implement is replaced by a different kind of implement, a work map will be transmitted to the machine body side control device from an implement side control device provided in this new implement after the replacement. So that, the machine body side control device will calculate a target position as a target of the position for the implement from a target value of the ground work for each unit section of the field included in the work map, based on which the actuator can be controlled. With this, it becomes possible to cope with replacement of many kinds of implements with simplification of the arrangement on the machine body side.

EMBODIMENT

Next, an embodiment as an example of the present invention will be explained with reference to the accompanying drawings. Incidentally, the direction denoted with an arrow with a sign F shown in FIG. 1 is the "front" side and the direction denoted with an arrow with a sign "U" shown in FIGS. 1 and 2 is the "upper" side and the direction denoted with an arrow with a sign "R" shown in FIG. 2 is the "right" side, respectively.

Figure 1:
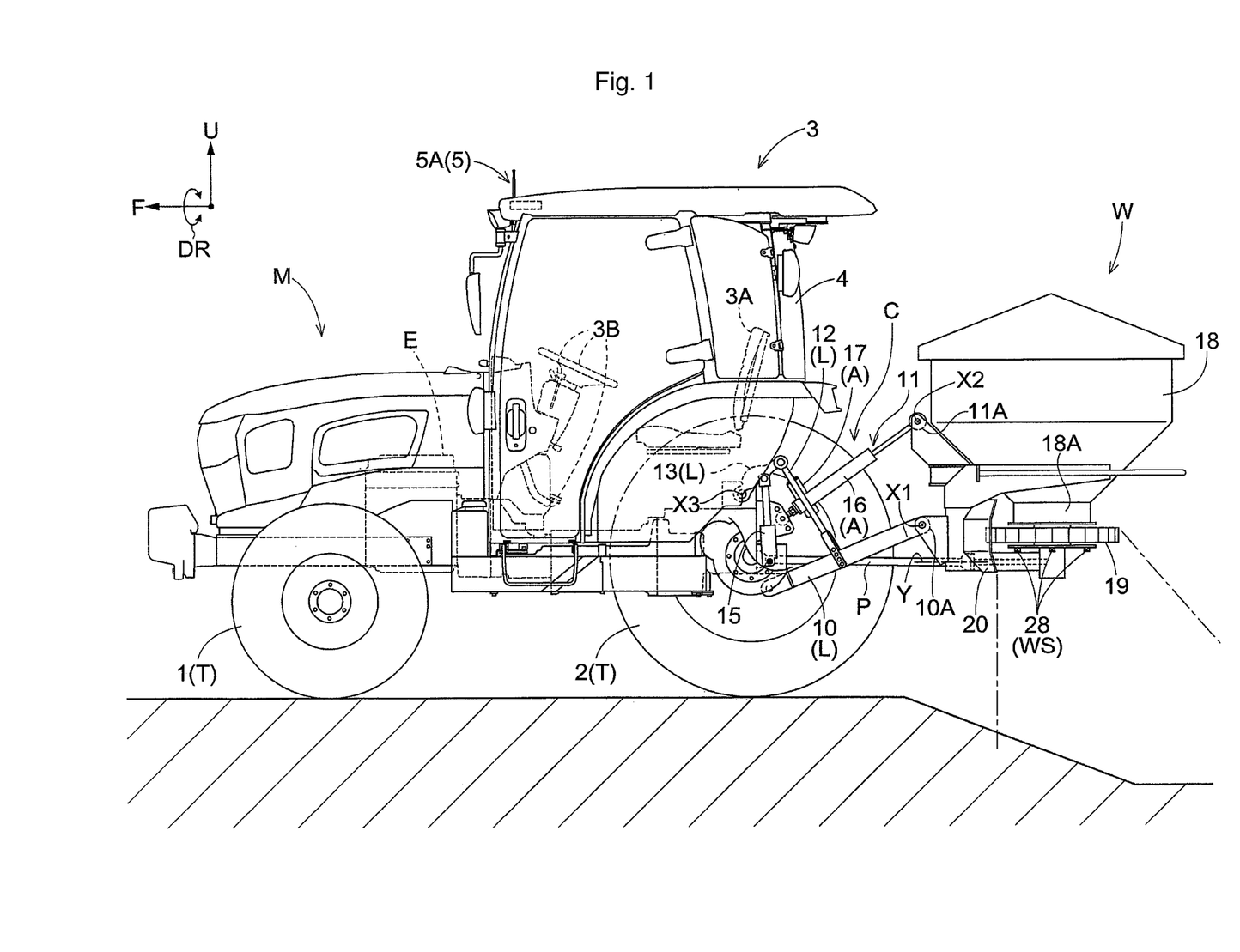
FIG. 1 is an overall side view of a work vehicle.
Figure 2:
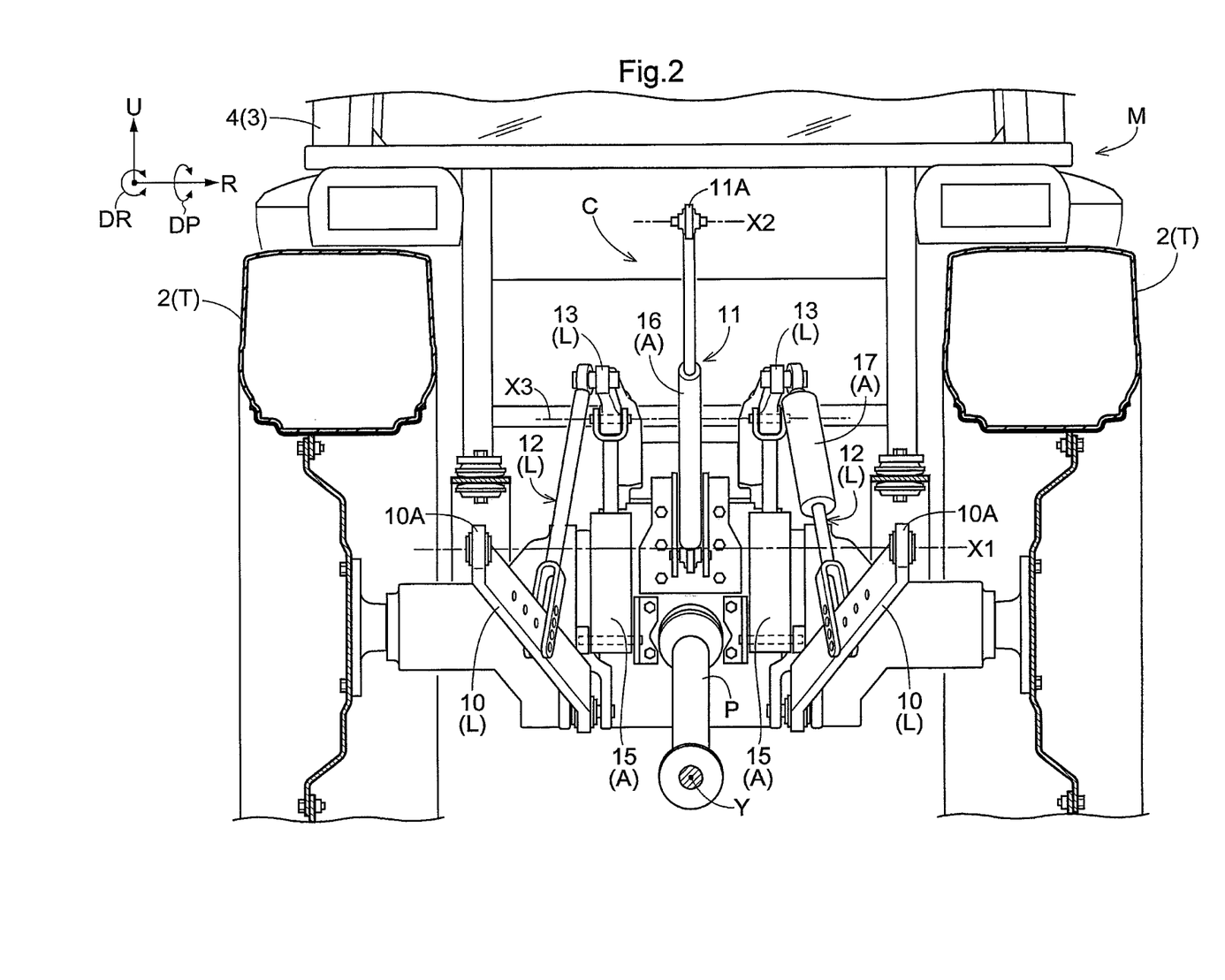
FIG. 2 is a view showing an arrangement of a connection mechanism for an implement in the work vehicle.

As shown in FIG. 1 and FIG. 2, a tractor (an example of a "work vehicle") includes a machine body M that can travel by a wheel type traveling device T, an implement W connected to a rear end portion of the machine body M via a connection mechanism C to be liftable up/down and capable of carrying out a ground work in association with traveling of the machine body M, an actuator A capable of changing a position of the implement W relative to the machine body M, etc.

The traveling device T includes a pair of steerable and drivable left and right front wheels 1 and a pair of drivable left and right rear wheels 2. A machine body frame of the machine body M is supported to the left and right front wheels 1 and the left and right rear wheels 2 via a suspension mechanism (not shown). The left and right front wheels 1 and the left and right rear wheels 2 are configured to be driven respectively by power of an engine E.

The machine body M includes a driving section 3 on which an operator can ride. The driving section 3 includes a driver's seat 3A at which the operator can be seated, a display device (not shown) capable of displaying various kinds of information, an operation input device 3B capable of inputting various kinds of operations, a cabin 4 that covers the riding space of the operator, and so on.

The machine body M includes also a satellite positioning module 5. This satellite positioning module 5 includes, in a ceiling area of the cabin 4, a satellite antenna 5A for receiving GNSS signals (e.g. GPS signals).

As shown in FIG. 1 and FIG. 2, etc., in the machine body M, there is provided the connection mechanism C for connecting the implement W. This connection mechanism C includes, a link mechanism L, a power transmission shaft P (a PTO shaft), and the actuator A.

The link mechanism L includes a pair of left and right lower links 10, a top link 11, a pair of left and right lift rods 12, a pair of left and right lift arms 13, etc. The top link 11 is disposed between the left and right lower links 10 in the left/right direction and also disposed upwardly of the lower links 10. The base end portions of the left and right lower links 10 and the base end portion of the top link 11 are supported to the machine body frame side of the machine body M to be pivotable about horizontal axes extending along the left/right direction.

As shown in FIG. 1 and FIG. 2, etc., the implement W is supported to lower leading end portions 10A which are the respective leading end portions of the left and right lower links 10 and a top leading end portion 11A which is the leading end portion of the top link 11. Namely, the link mechanism L is constituted as a three-point link mechanism supporting the implement W at three points. A left side portion and a right side portion of the lower portion of the implement W are supported respectively to the lower leading end portions 10A of the left and right lower links 10 to be pivotable about a first axis X1. Further, a left/right center portion of the upper portion of the implement W is supported to the top leading end portion 11A of the top link 11 to be pivotable about a second axis X2 that extends along the left/right direction.

Each link rod 12 is attached between the lift arm 13 and the lower link 10 that correspond thereto. The attaching position of the lift rod 12 to the lower link 10 is adjustable as desired. The lift rod 12 is supported to the lift arm 13 to be pivotable about a third axis X3 that extends along the left/right direction. Also, the connecting portion between the lift arm 13 and the lift rod 12 is constituted as a join having a spherical face.

The power transmission shaft P is disposed between the left and right lower links 10 in the left/right direction and disposed also downwardly of the top link 11. This power transmission shaft P is driven by power from the engine E. The power transmission shaft P is configured to be rotatably driven about a transmission axis Y extending along the front/rear direction to transmit the power to the implement W.

[Actuator]

As shown in FIG. 1, FIG. 2, etc., the actuator A is provided in the machine body M. The actuator A is driven by power of the engine E. As this actuator A, there are provided a pair of left and right lift cylinders 15 capable of lifting up/down the implement W relative to the machine body M, a link cylinder 16 capable of changing a length of the top link 11 capable of changing posture of the implement W relative to the machine body M in a pitching direction DP, and a rolling cylinder 17 capable of changing posture of the implement W relative to the machine body M in a rolling direction DR.

Each one of the left and right lift cylinders 15 is connected to the lift arm 13 corresponding thereto. The left and right lift arms 13 are supported to the machine body frame side to be pivotable about the third axis X3 extending along the left/right direction. When the lift cylinder 15 is extended, the corresponding lift arm 13 is pivoted upwards about the third axis X3, whereby the lower leading end portion 10A of the lower link 10 is raised via the lift rod 12 and the implement W attached to this lower link 10 is also raised. On the other hand, when the lift cylinder 15 is contracted, the corresponding lift arm 13 is pivoted downwards about the third axis X3 extending along the left/right direction, whereby the lower leading end portion 10A of the lower link 10 is lowered via the lift rod 12 and the implement W attached to this lower link 10 is also lowered. Normally, control arrangement is provided so that the extension and contraction amounts of the left and right lift cylinders 15 are equal to each other.

The link cylinder 16 is constituted as a part of the top link 11. When this link cylinder 16 is extended, the top leading end portion 11A of the top link 11 is moved rearwards thereby to vary the pitching amount so that the implement W attached to this top link 11 is tilted rearwards. On the other hand, when the link cylinder 16 is contracted, the top leading end portion 11A of the top link 11 is moved forwards thereby to vary the pitching amount so that the implement W attached to the top link 11 is tilted forwards.

The rolling cylinder 17 is provided in one of the left and right lift rods 12. When this rolling cylinder 17 is extended, the corresponding lift rod 12 is extended and the leading end portion of the corresponding lower link 10 is lowered. On the other hand, when the rolling cylinder 17 is contracted, the corresponding lift rod 12 is contracted and the leading end portion of the corresponding lower link 10 is raised. With this, a difference is developed between the heights of the leading end portions of the left and right lower links 10, so that the rolling amount of the implement W attached to the leading end portions of the left and right lower links 10 of the machine body M can be changed.

[Implement]

As shown in FIG. 1, FIG. 2 etc., the implement W is connected to the machine body M via the link mechanism L and the actuator A to be capable of carrying out a ground work. Also, the implement W is configured to carry out the ground work under a state thereof being spaced (distant) from the ground surface.

Specifically, the implement W is constituted as e.g. spreader capable for spraying a farming material (granular fertilizer, a chemical agent) onto a field. The spreader includes a hopper 18 capable of storing an amount of the framing material, a delivering section 18A for delivering the farming material downwards from the hopper 18, a rotary blade 19 for splattering the farming material, a pair of left and right guide members 20 for guiding the farming material splattered by the rotary blade 19, and so on. The delivering section 18A and the rotary blade 19 are driven by the power of the engine E which is transmitted via the power transmission shaft P.

The spreader is configured such that in association with traveling of the machine body M, the farming material stored in the hopper 18 is delivered by the delivering section 18A and splattered by the rotary blade 19 and guided by the guide members 20 to be sprayed obliquely rearwardly and downwardly onto a conically shaped area (a fan-shaped area as seen in a plan view, though not shown). In this spreader, by changing the amount of farming material delivered from the delivering section 18A, the feeding amount of the farming material for the field can be varied. Further, in this spreader, the spraying range of the farming material for the field can be changed by varying the rotational speed of the rotary blade 19 or changing the postures of the left and right guide members 20.

[Machine Body Side Sensor]

Figure 3:
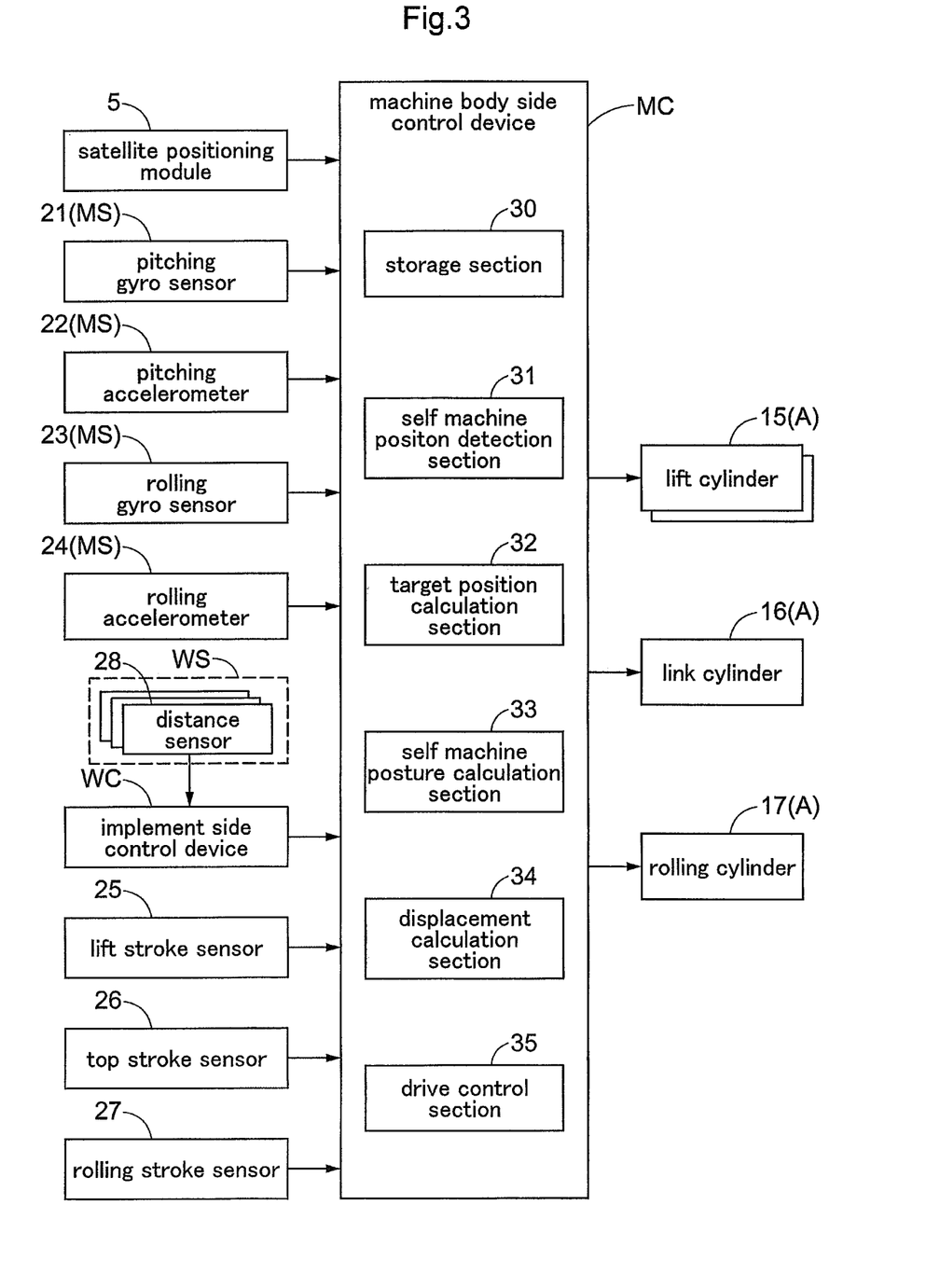
FIG. 3 is diagram showing an arrangement of controlling an actuator.

As shown in FIG. 3, the machine body M is provided with a machine body side sensor MS capable of detecting posture changes of the machine body M. As the machine body side sensor MS, there are provided a pitching gyro sensor 21 and a pitching accelerometer 22 for detecting a tilt (front/rear tilt) of the machine body M in the pitching direction DP and a rolling gyro sensor 23 and a rolling accelerometer 24 for detecting a tilt (left/right tilt) of the machine body M in the rolling direction DR.

Also, as shown in FIG. 3, the machine body M is provided also, in addition to the machine body side sensor MS, a lift stroke sensor 25 capable of detecting lengths of the left and right lift cylinders 15, a top stroke sensor 26 capable of detecting a length of the link cylinder 16 of the top link 11, and a rolling stroke sensor 27 capable of detecting a length of the rolling cylinder 17.

[Implement Side Sensor]

As shown in FIGS. 1 through 3, the implement W includes an implement side sensor WS capable of detecting positions of the implement W relative to the ground surface. As such implement side sensor WS, there are provided three (an example of "a plurality") distance sensors 28 for detecting the height of the implement W relative to the ground surface. Such distance sensors can be constituted of e.g. ultrasonic sensors. The three distance sensors are disposed on the bottom face of the implement W, with the three distance sensors 28 being offset in their disposing positions in the left/right direction and the front/rear direction from each other. With provision of the three distance sensors 28 described above, the height of the implement W relative to the ground surface, the tilt of the implement W relative to the ground surface in the pitching direction DP and the tilt of the implement W relative to the ground surface in the rolling direction DR can be calculated.

[Implement Side Control Device]

As shown in FIG. 3, the implement W is provided with an implement side control device WC for obtaining a position of the implement W relative to the ground surface from the implement side sensor WS. This implement side control device WC is constituted of e.g. a microcomputer. And, the implement side control device WC stores therein a work map in which respective target values for a ground work are set for respective unit sections of the field.

[Machine Body Side Control Device]

Figure 4:
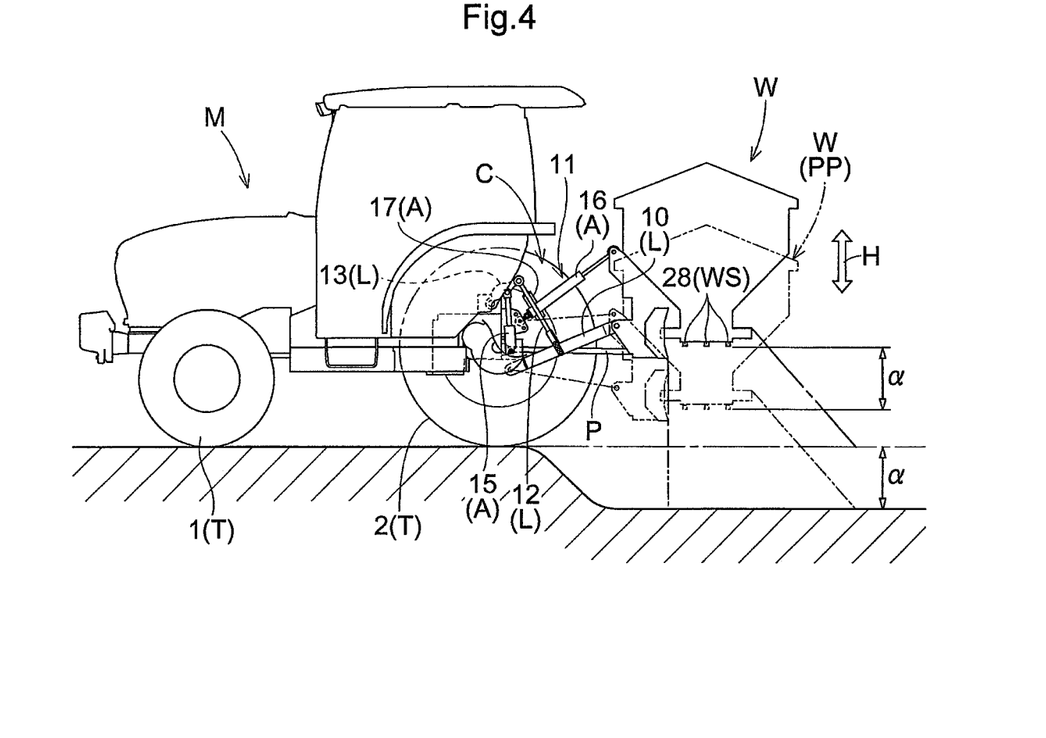
FIG. 4 is a schematic diagram showing a mode of position control of an implement in case there exists a level difference between the ground surface with which the machine body is placed in contact and the ground surface located immediately below the implement.
Figure 5:
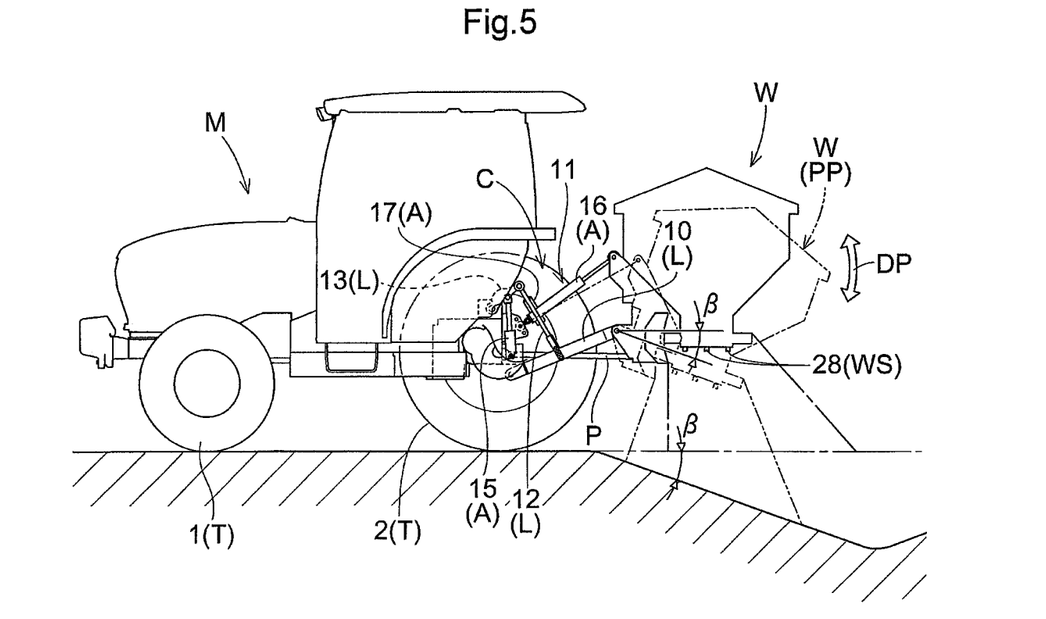
FIG. 5 is a schematic diagram showing a mode of position control of the implement in case there exists a slope difference in a pitching direction between the ground surface with which the machine body is placed in contact and the ground surface located immediately below the implement.
Figure 6:
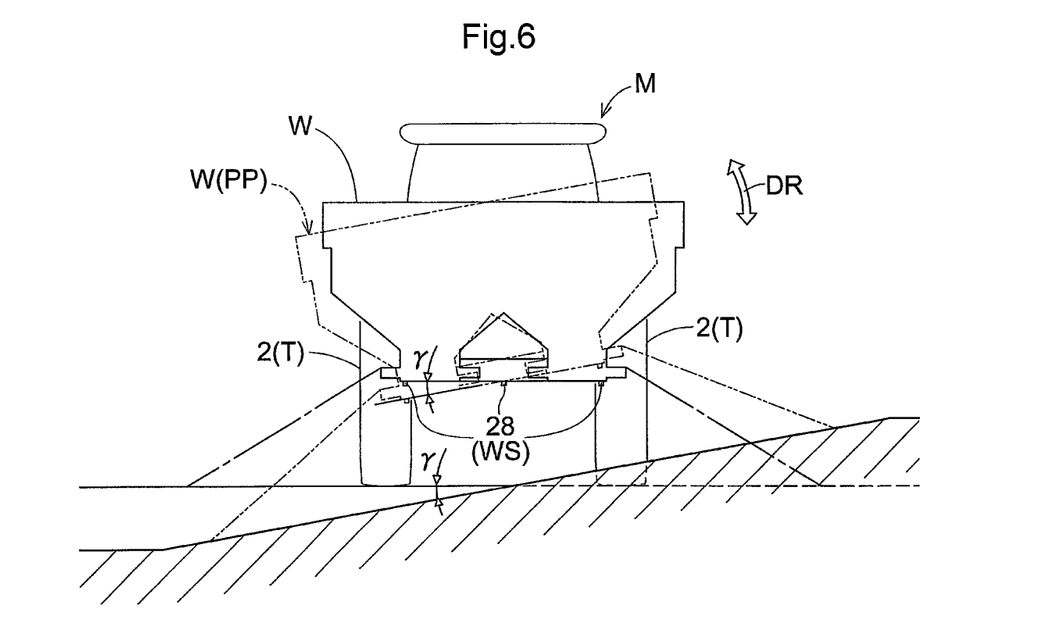
FIG. 6 is a schematic diagram showing a mode of position control of the implement in case there exists a slope difference in a rolling direction between the ground surface with which the machine body is placed in contact and the ground surface located immediately below the implement.

As shown in FIG. 3, the machine body M is provided with a machine body side control device MC for controlling the actuator A so that the position of the implement W relative to the ground surface may agree with a target position PP (see FIGS. 4 through 6). This machine body side control device MC is constituted of e.g. a microcomputer. Also, the machine body side control device MC is connected to the implement side control device WC to be able to communicate therewith.

As shown in FIG. 3, to the machine body M, there will be inputted positioning information of the satellite positioning module 5, a value of the pitching gyro sensor 21, a value of the pitching accelerometer 22, a value of the rolling gyro sensor 23, a value of the rolling accelerometer 24, information from the implement side control device WC, a value of the lift stroke sensor 25, a value of the top stroke sensor 26, a value of the rolling stroke sensor 27, etc.

The machine body side control device MC shown in FIG. 3 is provided with a storage section 30 storing various kinds of information therein, a self machine position calculation section 31, a self machine posture calculation section 33, a target position calculation section 32, a displacement calculation section 34, a drive control section 35, and so on.

The storage section 30 shown in FIG. 3 stores therein size information of the respective members of the link mechanism L, information on attaching position of the lift rod 12 relative to the lower links 10, a field map of a field where a work is to be carried out, and so on. In the field map, position information is correlated for each unit section.

The self machine position calculation section 31 shown in FIG. 3, based on the positioning information of the satellite positioning module 5, calculates position information of the self machine of the machine body M, reads out the field map from the storage section 30, calculates a self machine position of the machine body M on the field map based on the position information of the self machine of the machine body M and selects a unit section in the field map in which the machine body M belongs.

The self machine posture calculation section 33 shown in FIG. 3 is configured to calculate the self machine posture of the machine body M. The self machine posture calculation section 33 is configured to calculate, based on a value of the pitching gyro sensor 21 and a value of the pitching accelerometer 22, a tilt amount of the machine body M in the pitching direction DP relative to its normal state (the pitching amount of the machine body M relative to the horizontal direction). Further, the self machine posture calculation section 33 is configured to calculate, based on a value of the rolling gyro sensor 23 and a value of the rolling accelerometer 24, a tilt amount of the machine body M in the rolling direction DR relative to its normal state (the pitching amount of the machine body M relative to the horizontal direction).

The target position calculation section 32 shown in FIG. 3 reads a work map obtained from the implement side control device WC and reads out a target value (a spraying amount or a spraying range) for each unit section of the field. Then, the target position calculation section 32 determines a target position PP (see FIGS. 4 through 6) of the implement W relative to the ground surface based on the target value.

The displacement calculation section 34 shown in FIG. 3 calculates a displacement amount of the position of the implement W relative to the ground surface calculated by the implement side control device WC based on the detection result of the implement side sensor WS (the plurality of distance sensors 28), from the target position PP of the implement W (see FIGS. 4 through 6) relative to the ground surface.

The drive control section 35 shown in FIG. 3 is configured to control the actuator A (the left and right lift cylinders 15, the link cylinder 16 of the top link 11, the low link cylinder 17), based on the target position PP of the implement W (see FIGS. 4 through 6) and the displacement amount relative to the target position PP.

More particularly, the machine body side control device MC refers to a current position of the machine body M obtained from the satellite positioning module 5 and the position information in the field map and selects a unit section where the machine body M is located. Then, the machine body side control device MC reads out a target value (e.g. a target spraying amount) assigned to this unit section selected in the work map. And, based on this read target value, the machine body side control device MC refers to a pre-stored correspondence list and calculates a target position PP (see FIGS. 4 through 6) of the implement W relative to the ground surface at that unit section.

Further, the machine body side control device MC shown in FIG. 3 is configured to control the actuator A, based on the information on the posture change of the machine body M obtained form the machine body side sensor MS and the information on the position of the implement W relative to the ground surface obtained from the implement side sensor WS via the implement side control device WC.

Moreover, the machine body side control device MC shown in FIG. 3 is configured also to control the actuator A, based on the information on the height of the implement W relative to the ground surface detected by the distance sensor 28 which is the implement side sensor WS.

Further, the machine body side control device MC shown in FIG. 3 is further configured to obtain the target value from the implement side control device WC and to calculate the target position PP (see FIGS. 4 through 6) from this target value.

With the above-described arrangements, as shown in FIG. 4, if e.g. there exists a level difference ($\alpha$) (higher or lower) in the height direction H between the ground surface with which the machine body M is placed in contact and the ground surface immediately below the implement W, the left and right lift cylinders 15 will be driven in such a manner as to resolve such level difference ($\alpha$), thus adjusting the height of the implement W. With this, the implement W can be maintained at the target position PP.

Further, for instance, as shown in FIG. 5, if the ground surface located immediately below the implement W is tilted in the pitching direction DP relative to the ground surface with which the machine body M is placed in contact, the link cylinder 16 of the top link 11 is driven in such a manner as to resolve such tilt difference ($\beta$), so that adjustment of the posture of the implement W is effected in the pitching direction DP so that the implement W may be placed substantially parallel with the ground surface. With this, the implement W can be maintained at the target position PP.

Moreover, for instance, as shown in FIG. 6, if the ground surface immediately below the implement W is tilted in the rolling direction DR relative to the ground surface with which the machine body M is placed in contact, the rolling cylinder 17 is driven in such a manner as to resolve such tilt difference ($\gamma$), so that adjustment of the posture of the implement W is effected in the rolling direction DR so that the implement W may be placed substantially parallel with the ground surface. With this, the implement W can be maintained at the target position PP. Incidentally, for the sake of illustration, illustration of the connection mechanism C is omitted in FIG. 6.

Further, for instance, as may be understood from FIGS. 4 through 6, if there exist the level difference ($\alpha$) in the height direction H between the ground surface with which the machine body M is placed in contact and the ground surface located immediately below the implement W, the tilt difference $\beta$ in the pitching direction DP as well as the tilt difference $\gamma$ in the rolling direction DR altogether in a complex manner, the left and right lift cylinders 15, the link cylinder 16 and the rolling cylinder 17 will be driven appropriately in such a manner as to resolve such terrain differences, so that the height position and the posture of the implement W will be adjusted appropriately so that the position of the implement W relative to the ground surface may agree with the target position PP (see FIGS. 4 through 6).

In this way, the detection results of the implement side sensor(s) WS are utilized for controlling of the actuator A to change the position of the implement W. With this, even in case a work traveling is carried out in a field having unevenness on its ground surface, the target position PP (see FIGS. 4 through 6) of the implement W relative to the ground surface may be maintained as expected. As a result, it is possible to achieve an expected spraying amount or expected spraying range of the farming material by the implement W, so that the implement can carry out a ground work as planned.

Incidentally, in FIGS. 4 through 6, there is illustrated a condition in which the machine body M is placed in contact with a flat ground surface. However, even in case the machine body M is located on an inclined ground surface too, if the tilt of the machine body M is detected and utilized for controlling of the actuator A, the position of the implement W relative to the ground surface can be maintained at the target position PP, like the above-described case of the machine body M being placed in contact with a horizontal ground surface.

Other Embodiments

Next, other embodiments including changes made in the foregoing embodiment will be explained. It is understood that each further embodiment can be applied in any combination to the foregoing embodiment unless contradiction occurs therefrom. Incidentally, the scope of the present invention is not limited to the contents disclosed in the respective embodiments.

(1) In the foregoing embodiment, the number of the distance sensors 28 is set to three. However, the invention is not limited thereto.

For instance, the number of the distance sensors 28 can be one or two or four or more. In case the number of the distance sensor 28 is set to one, it is preferred that this distance sensor 28 be disposed at the left/right center portion of the implement W.

(2) In the foregoing embodiment, the distance sensors 28 are ultrasonic sensors. However, the invention is not limited thereto. For instance, other types of sensors such as laser scanners can be employed.

(3) In the foregoing embodiment, the distance sensors 28 are employed as the implement side sensors WS. However, the invention is not limited thereto. For instance, as the implement side sensors WS, it it also possible to employ e.g. a camera unit configured to image-capture a ground surface and to process the captured image to calculate a three-dimensional shape of unevenness of a field.

(4) In the foregoing embodiment, the target position PP of the implement W relative to the ground surface is calculated by the machine body side control device MC. However, the invention is not limited thereto. For instance, the implement side control device WC may calculate the target position PP of the implement W relative to the ground surface and the calculated target position PP may be transmitted from the implement side control device WC to the machine body side control device MC.

(5) In the foregoing embodiment, there was illustrated a case in which the target position PP is set such that the implement W may be positioned substantially parallel with the ground surface in the pitching direction DP. However, the invention is not limited thereto. For instance, the target position PP may be set such that the implement W may have a slope difference of a predetermined angle in the pitching direction DP relative to the ground surface.

(6) In the foregoing embodiment, there was illustrated a case in which the target position PP is set such that the implement W may be positioned substantially parallel with the ground surface in the rolling direction DR. However, the invention is not limited thereto. For instance, the target position PP may be set such that the implement W may have a slope difference of a predetermined angle in the rolling direction DR relative to the ground surface.

(7) In the foregoing embodiment, the target value for a ground work by the implement W is set for each unit section of a field. However, the invention is not limited thereto. For instance, a target value for a ground work by the implement W may be set for each field. In this case, the ground work will be carried out uniformly by the implement W throughout the field.

(9) In the foregoing embodiment, there was illustrated a case in which the lift cylinders 15 are provided as one left and right pair. However, the invention is not limited thereto. For instance, the lift cylinder 15 may be provided only one at the left/right center portion of the machine body M. In this case, both of the left and right lift arms 13 will be lifted up/down by extension/contraction of the single lift cylinder 15.

(9) In the foregoing embodiment, there was illustrated a case in which the link cylinder 16 includes a part of the top link 11. However, the invention is not limited thereto. For instance, it is possible to provide an extensible/contractible top link 11 not including any part of the link cylinder 16 and a link cylinder 16 for extending/contracting the top link 11 provided separately from and in parallel with the top link 11.

(10) In the foregoing embodiment, there was illustrated a case in which as the actuator A, the link cylinder 16 of the top link 11 and the rolling cylinder 17 are provided. However, the invention is not limited thereto. For instance, the link cylinder 16 of the top link 11 may not be provided. In this case, the arrangement will be simplified with omission of the position control for the pitching direction DP of the implement W. Further, for instance, the rolling cylinder 17 may not be provided. In this case, the arrangement will be simplified with omission of the position control for the rolling direction DR of the implement W.

(11) In the foregoing embodiment, a spreader was shown as an example of the implement W configured to carry out a ground work under a state of being spaced from the ground surface. However, the invention is not limited thereto. For instance, the implement W may be other implement for carrying out a ground work (carrying out a spraying of farming material onto the ground surface) under a state of being spaced from the ground surface, such as a sprayer, a broad caster, etc.

(12) In the foregoing embodiment, there was illustrated farming material in the form of granular material. However, the invention is not limited thereto. The farming material may be in the form of liquid.

(13) In the foregoing embodiment, the implement W is configured to carry out a ground work under a state of being spaced from the ground surface. However, the invention is not limited thereto. For instance, the implement W may be configured to carry out a ground work under a state of being placed in contact with the ground surface. As examples of the implement W in this case, there can be cited a cultivator (a plow, a rotary), a crusher (a harrow, a packer, etc.).

(14) In the foregoing embodiment, a wheel type traveling device T was illustrated. However, the invention is not limited thereto. The traveling device T may be of any other type such as a crawler type, a semi-crawler type, etc.

INDUSTRIAL APPLICABILITY

The present invention is applicable to various kinds of farming work vehicles such as the above-described tractor, a combine, a grass cutting machine, a rice planter, etc. as well as to various kinds of work vehicles such as a civil engineering machine, etc.

DESCRIPTION OF SIGNS

11: top link
15: lift cylinder
16: link cylinder
17: rolling cylinder
28: distance sensor
A: actuator
DP: pitching direction
DR: rolling direction
M: machine body
MC: machine body side control device
MS: machine body side sensor
PP: target position
W: implement
WC: implement side control device
WS: implement side sensor

The invention claimed is:

1. A work vehicle comprising:
an implement connected to a machine body and capable of carrying out a ground work;
an actuator provided in the machine body and capable of changing a position of the implement relative to the machine body;
a machine body side sensor provided in the machine body and capable of detecting a posture change of the machine body;
an implement side sensor provided in the implement and capable of detecting a position of the implement relative to the ground surface, wherein the position of the implement includes a tilt of the implement relative to the ground surface and a height of the implement relative to the ground surface;
an implement side control device provided in the implement and obtaining the position of the implement relative to the ground surface from the implement side sensor;
a machine body side control device provided in the machine body and controlling the actuator so that the positon of the implement relative to the ground surface may agree to a target position;
a displacement calculation section which calculates a displacement amount of the position of the implement from the target position obtained from the implement side sensor via the implement side control device; and
the machine body side control device being configured to control the actuator based on information on the posture change of the machine body obtained from the machine body side sensor and information on the position of the implement relative to the ground surface obtained from the implement side sensor, and to adjust the actuator so as to resolve:
a level difference, which is calculated in accordance with the displacement amount, in the height direction, between the ground surface with which the machine body is placed in contact, and the ground surface immediately below the implement, and
a tilt difference between the ground surface with which the machine body is placed in contact, and the ground surface immediately below the implement.

2. The work vehicle of claim 1, wherein the implement is configured to carry out a ground work under a state of being spaced from the ground surface.

3. The work vehicle of claim 2, wherein:
as the implement side sensor, there is provided a distance sensor for detecting a height of the implement relative to the ground surface; and
the machine body side control device is configured to effect controlling of the actuator, based on information relating to the height of the implement relative to the ground surface detected by the distance sensor.

4. The work vehicle of claim 1, wherein:
the implement side control device stores therein a work map in which respective target values for a ground work are set for respective unit sections; and
the machine body side control device is configured to obtain a target value from the implement side control device and calculate the target position from the target value.

5. A work vehicle comprising:
an implement connected to a machine body and capable of carrying out a ground work;
an actuator provided in the machine body and capable of changing a position of the implement relative to the machine body;
a machine body side sensor provided in the machine body and capable of detecting a posture change of the machine body;
an implement side sensor provided in the implement and capable of detecting a position of the implement relative to the ground surface;
an implement side control device provided in the implement and obtaining the position of the implement relative to the ground surface from the implement side sensor;
a machine body side control device provided in the machine body and controlling the actuator so that the positon of the implement relative to the ground surface may agree to a target position; and
the machine body side control device being configured to control the actuator based on information on the posture change of the machine body obtained from the machine body side sensor and information on the position of the implement relative to the ground surface obtained from the implement side sensor,
wherein the actuator includes a lift cylinder capable of lifting up/down the implement relative to the machine body, a link cylinder capable of changing a length of a top link capable of changing a posture of the implement in a pitching direction relative to the machine body, and a rolling cylinder capable of changing a posture of the implement in a rolling direction relative to the machine body.

* * * * *